INVENTORS
DANIEL W. BATES
ERNEST W. MURPHEY

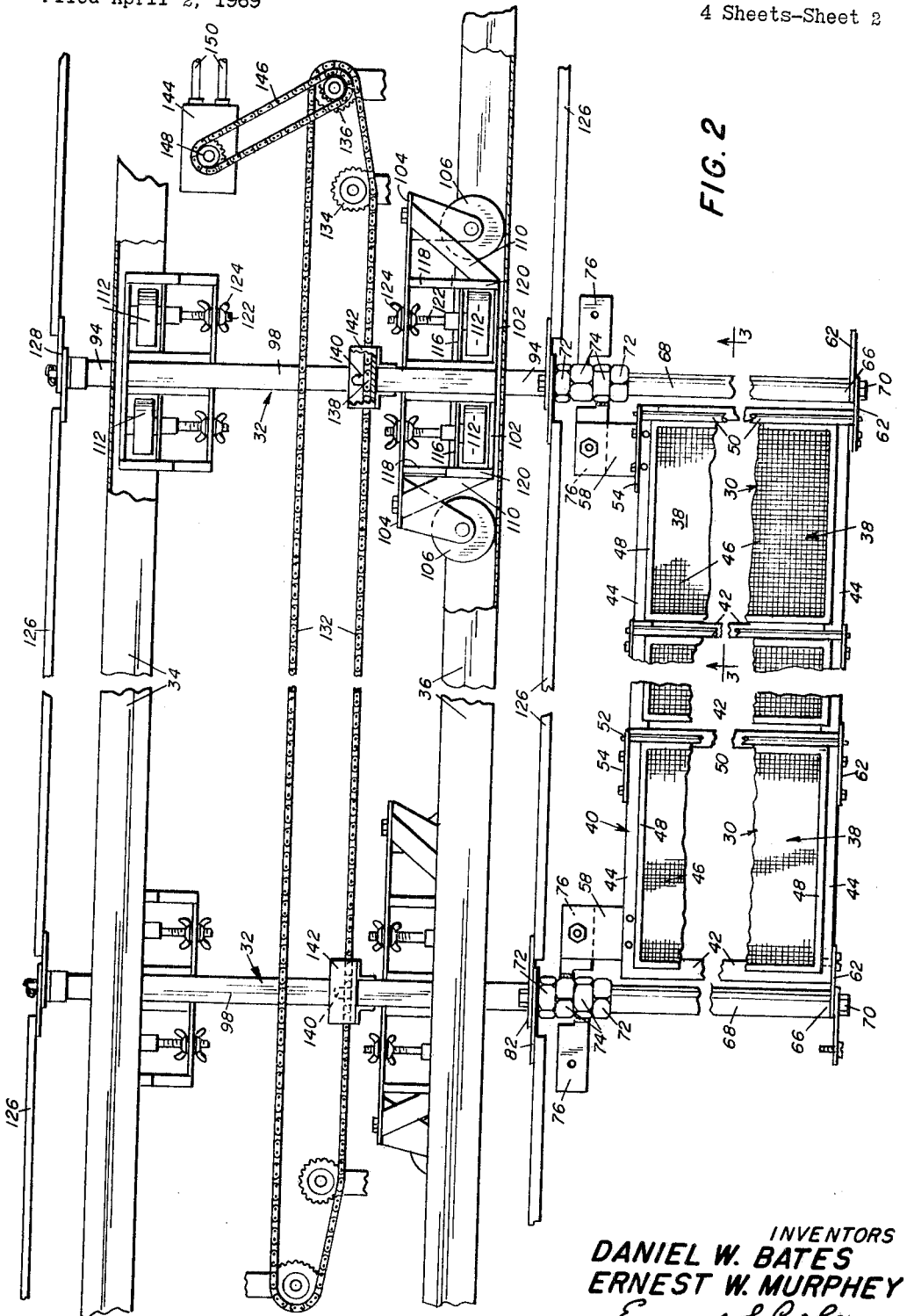

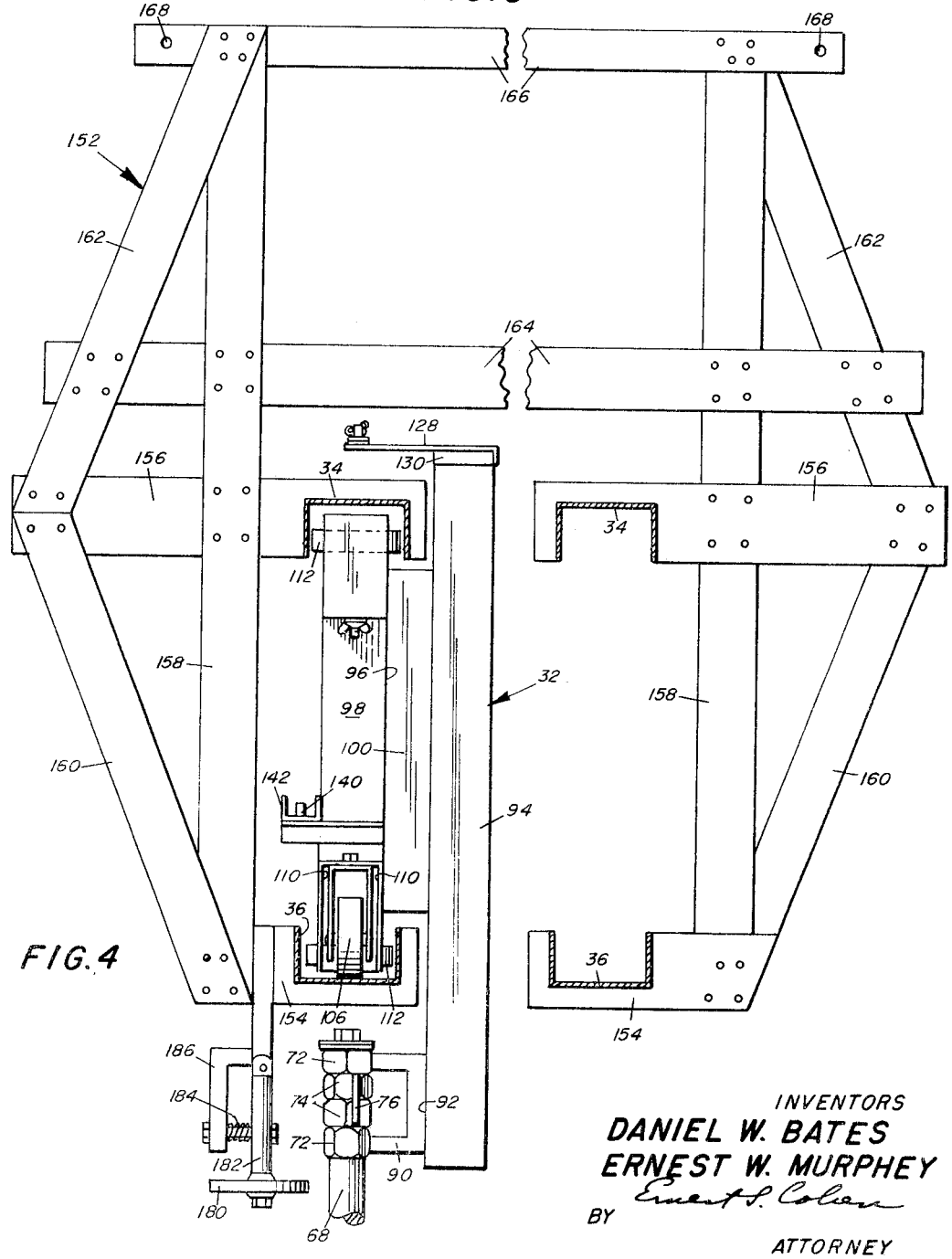

INVENTORS
DANIEL W. BATES
ERNEST W. MURPHEY
BY Ernest S. Cohen
ATTORNEY

United States Patent Office 3,508,659
Patented Apr. 28, 1970

3,508,659
CANTILEVERED TRAVELING SCREEN
Daniel W. Bates, Portland, and Ernest W. Murphey, Tigard, Oreg., assignors to the United States of America as represented by the Secretary of the Interior
Filed Apr. 2, 1969, Ser. No. 812,740
Int. Cl. B01d 29/02
U.S. Cl. 210—160                 10 Claims

ABSTRACT OF THE DISCLOSURE

An endless screen travels on cantilevered carriages which are supported by an oval track. The screen is partially submerged for continuous filtration of a flowing fluid. Critical moving parts remain above the fluid surface, reducing maintenance difficulties.

BACKGROUND OF THE INVENTION

This invention concerns filtering apparatus, and more specifically a traveling cantilevered screen for diverting live fish and suspended matter from a flowing fluid.

Industrial consumption of water resources often disturbs the ecological balance of natural water supplies. Hydroelectric dams and generating plants, chemical processing plants, and irrigation systems are typical industrial operations which are potentially hazardous to fish and other aquatic life. Fish entering the shallow confines of irrigation channels and water supply ducts are often unable to return to their natural environments. Chemical and industrial processing plants which require filtered water supplies often injure aquatic life in the filtration process. Hydroelectric dams and generating plants impede the natural upstream and downstream travel of migratory fish.

While conservation of valuable water resources requires that industrial consumers make efficient and economic use of water supplies, the equally desirable conservation of aquatic life requires a reduction in the dangers resulting from unrestricted tampering with the balancing forces of nature. The traveling cantilevered screen of this invention fulfills these requirements with greater safety and efficiency than has been previously achieved.

Prior fish screens have employed horizontal and vertical rotating drums to restrict fish from a hazardous environment. Fish screens with an endless belt of individual screens traveling in a vertical loop have also been used. These and other screens are described in detail in a book published in 1961 by the Department of Fisheries of Canada and titled Design of Fishways and Other Fish Facilities, by C. H. Clay. Other prior devices include a partially submerged continuous belt of wire screen horizontally traveling around spaced cylindrical drums. Each of these prior fish screens has critical mechanical parts submerged in the filtered body of water, with inherent problems of corrosion and fouling, and difficult lubrication and maintenance. Prior attempts to overcome these problems have not been entirely successful. A traveling curtain of individually weighted suspended chains, drawn through a body of water in a continuous closed loop, overcame the maintenance difficulties inherent in prior screens, but formed an incomplete barrier to aquatic life. Closer spacing between adjacent chains increased the effectiveness of the barrier but disproportionately increased the impediment to water flow and the planing effect of the water upon the chains. For these reasons the previously available fish screens were unsuitable to the complete and efficient protection of aquatic life.

SUMMARY OF THE INVENTION

This invention is a horizontal traveling cantilevered screen for continuously filtering a fluid. The screen is positioned across a river in the embodiments shown, to protect fish and other aquatic life by diverting them into a by-pass channel around a hazardous downstream environment.

A continuous horizontal series of vertical screen sections, forming a closed loop, is suspended from cantilevered carriages which ride on vertically spaced pairs of horizontal oval tracks. The screen sections and carriages are drawn around the oval tracks by a drive chain, powered by a hydraulic motor. Each screen section includes pivotable screen segments which are closed by water pressure in one direction, and are opened by water pressure in the other direction. The traveling screen is oriented across a river at an acute angle to the direction of flow, with the downstream end positioned adjacent to a by-pass channel around a hazardous downstream environment.

The horizontal orientation of the traveling screen is suited to filtering the wide expanses of water typically encountered above dams and high volume water intakes. As the screen travels through a body of water, fish and other suspended particles are directed toward a common control area. The speed of screen travel is adjusted to equalize the downstream component of screen speed to the rate of flow of the water in which the screen travels. This equalization optimizes the efficiency of the screen by directing fish and other objects which encounter the screen in a downstream direction at a rate equal to the rate of flow, while simultaneously directing them in a cross-stream direction.

The traveling screen is suspended from above to simplify maintenance and reduce wear and deterioration of mechanical components. All critical moving parts on the screen are above water level and readily available for lubrication and replacement. Overhead suspension is achieved by cantilevered carriages which support each screen section for movement along the oval tracks, but restrain the screen section from rotation around the tracks. An additional advantage of the cantilevered suspension is a reduction in head loss at the screen, since only the submerged screen impedes the downstream flow of water. Further reduction in head loss and self-cleaning of the screen result from pivotal opening of the segments of each screen section on the closed loop of screen sections as the screen travels the return half of each cycle of operation.

An alternate form of cantilevered traveling screen has a continuous wire screen suspended from a single vertical track with parallel races. A strong coarse mesh adapts the continuous screen to the removal of large floating and submerged objects from a flowing body of water. A continuous suspended drive cable connects suspended cantilevered carriages for driving the continuous screen around the single track.

It is therefore an object of the present invention to provide a cantilevered traveling screen for the filtration of a fluid.

A further object of this invention is to provide an efficient traveling fish screen which is durable and easily maintained.

A still further object of this invention is to provide a traveling screen for efficiently filtering wide expanses of fluid.

A still further object of this invention is to provide a traveling fish screen with a minimum harmful effect on aquatic life.

A still further object of this invention is to provide a traveling screen for continuous trash removal in a flowing body of water.

These and other objects of this invention will become more fully apparent with reference to the following specification and drawing which describe the preferred embodiments of the invention.

BRIEF DESCRIPTION OF THE DRAWING

FIGURE 2 is a detailed partial side view of a carriage and a screen section of one embodiment of the invention.

FIGURE 3 is a sectional view taken along lines 3—3 in FIGURE 2.

FIGURE 4 is a transverse view of a track support and carriage of one embodiment of the invention.

DETAILED DESCRIPTION

Figure 1:
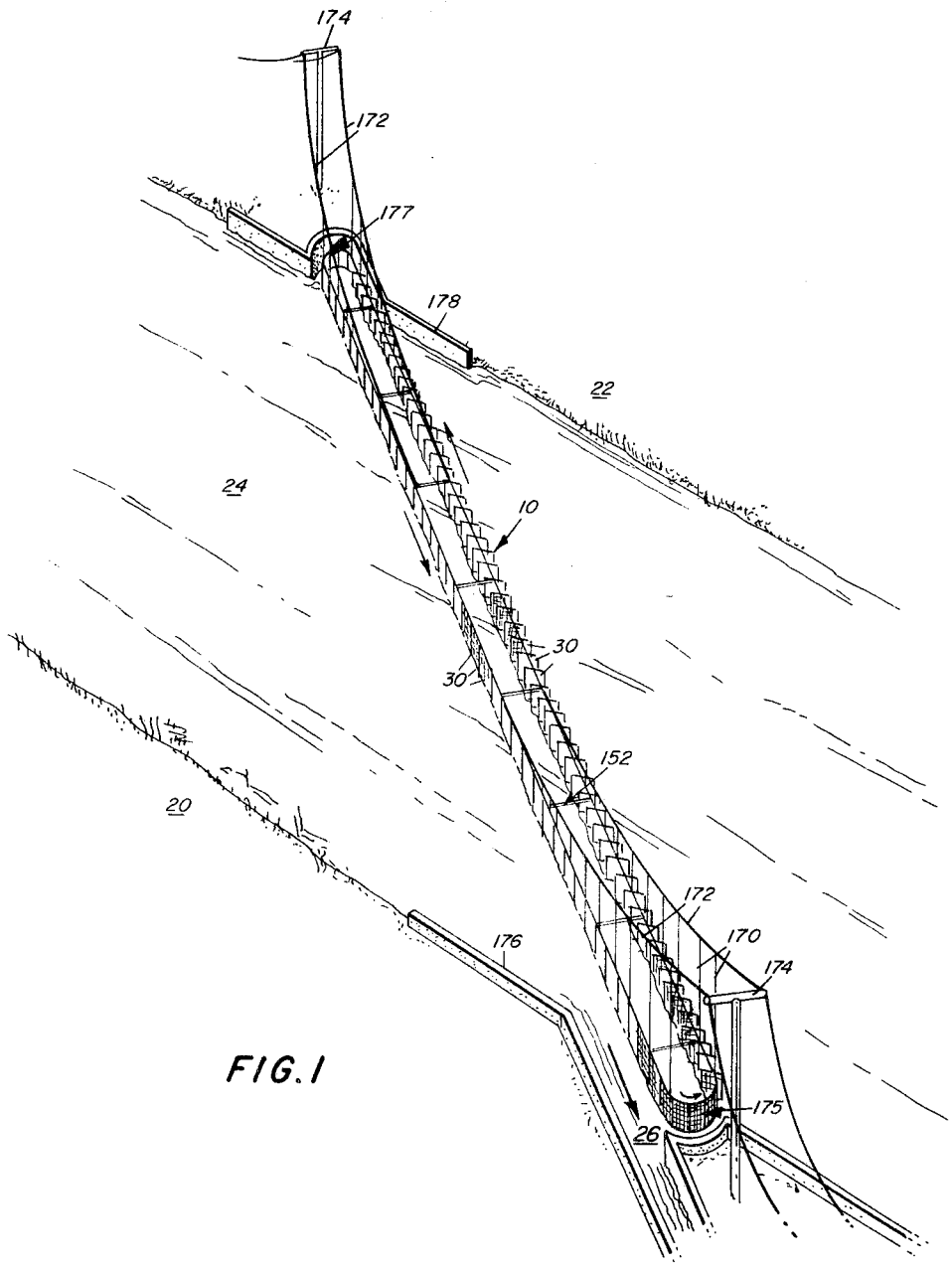
FIGURE 1 is a perspective view of one embodiment of the invention in operative position between the banks of a river.

A traveling cantilevered screen 10 is shown in FIG. 1 in operating position between the banks 20 and 22 of a river 24. The traveling screen extends diagonally between the banks 20 and 22 of the river 24 at an acute angle to the direction of flow, which in FIG. 1 is from left to right. The traveling screen directs fish and other suspended matter on the upstream side of the river into a by-pass channel 26 around a hazardous downstream environment (not shown).

The traveling screen 10 includes a suspended closed series of screen sections 30 which form a loop of filter medium and are supported from above by cantilevered carriages 32, as shown in detail in FIG. 2. The carriages 32 ride on the inner races of mutually inverted upper and lower oval tracks 34 and 36 of U-shaped cross section. The carriages travel freely in the direction of the tracks, but are subjected to cantilevered restraint in the direction perpendicular to the tracks.

Each screen section 30 has three screen segments 38 which pivot freely on a rigid tubular framework 40 on the screen section, as shown in FIGS. 2 and 3. The screen segments 38 have a taut, wire mesh filter medium 46 bonded to a rigid rectangular framework 48, and are similar to ordinary aluminum window screens. The framework 40 has four equally spaced vertical shafts 42 mounted between spaced horizontal stringers 44. The length and width of the rectangular framework 48 of the screen segments 38 approximates the spacing between the horizontal stringers 44 and the vertical shafts 42, respectively, of the framework 40. A tubular shaft 50 extends along an edge and slightly beyond the ends of each screen segment 38. The shaft terminates at each end with a smooth flat machined surface from which a narrow axially aligned spindle 52 projects. Apertured bearing plates 54 secure the tubular shafts 50 to the framework 40, with each tubular shaft positioned adjacent a vertical shaft 42. Each segment is pivotable about the tubular shaft 50 on the spindles 52 which ride in holes in the bearing plates 54. In closed position the edges of the screen segments 38, on the side opposite the tubular shafts 50, are spaced slightly from the tubular shaft of the serially following screen segment. Each screen segment 38 overlaps the sides of two vertical risers 42 and the sides of the horizontal stringers 44, forming a continuous filter medium on the screen section 30.

Flat apertured tie plates 58 extend from the upper horizontal stringer 44 of the framework 40, adjacent each end of the stringer on the side opposite the screen segments 38. Flat apertured tie bars 62 extend beyond the sides of the tubular framework 40 from the lower side of the lower horizontal stringer 44. The tie bars 62 pivot about their apertures on fasteners 70 secured to the lower ends 66 of hinge poles 68, with the adjacent tie bars of adjacent screen sections pivoting on a common hinge pole. The upper end of each hinge pole 68 extends above the upper horizontal stringer 44 and passes through the smooth bores of four adjacent axially aligned hexagonal sockets 72 and 74. The outer sockets 72 are rigidly coupled to the end and body of the hinge pole, while the inner sockets 74 are free to rotate around the pole.

Flat apertured hinge plates 76 extend in opposite directions from a vertical face of each inner hexagonal socket 74, in alignment with the tie plates 58 on tubular framework 40. Each screen section 30 hangs between a pair of hinge poles 68 on tie plates 58 and hinge plates 76, which are rigidly coupled. The screen sections 30 rotate freely around the axes of hinge poles 68 on the pivotal connections of tie bars 62 and hinge plates 76. The center of gravity of the screen sections 30 is positioned within the plane defined by the axes of the hinge poles to reduce strain on the poles and on the pivotal connections.

Similar upright screen sections 30 are serially joined between horizontally spaced hinge poles 68, with the first and last screen sections connected to form a closed loop. The loop of screen sections 30 forms a continuous filter medium which resembles an endless, segmented conveyor belt, with the conveying surface lying in a vertical rather than a horizontal plane. As the loop of serially joined screen sections moves in an oval path, two independent relative degrees of freedom interact. In one degree of freedom, adjacent screen sections 30 pivot relative to each other around the hinge pole between them. This pivotal interaction allows the rigid planar screen sections 30 to approximate a semicircular arc at each end of the oval loop, and provides the effective flexibility of a continuous mesh, while achieving the strength of a rigid filter medium.

In another degree of freedom each screen segment 38 is independently pivotable on the closed loop of screen sections in an area for which the closed loop of screen sections forms an inner bound. As the loop of screen sections moves in an oval path this pivotal action provides a selective opening or closing of the segments on the loop of screen sections. The pivoted screen segments, in combination with the rigid tubular framework 40 are operable both as a continuous filter medium for effluent impinging upon the face of the segments opposite the tubular framework, and as an open framework for effluent impinging upon the segments from the face adjacent the tubular framework 40. As the screen sections 30 advance through a fluid having a component of flow in the direction of closure of the screen segments 38, particles in the fluid are restrained by the wire mesh 46. Where the fluid has a component of flow in the direction of opening of the segments 38, fluid pressure opens the segments, allowing free passage of the fluid and any suspended particles. Alternately, the screen segments are fixed in a closed position when selective opening and closing is not required.

The outer hexagonal sockets 72 which are fixed to bearing pole 68 are each attached by their co-planar vertical faces 86 and 88 to an individual lip of a U-shaped channel 90, with the base of the channel facing in the direction of closure of screen segments 38, as shown in FIGURE 4. A tubular lever arm 94 extends upward from the base of channel 90 to a tubular chassis 98 which joins the lever arm through an intermediate tubular spacer 100. The vertical axis of the tubular chassis 98 is aligned with the axis of the hinge pole 68 which is suspended below the lower end of the chassis.

Tubular chassis 98 has pairs of open rectangular frames 102 fixed to each end on opposite sides of the chassis, forming an I-shaped framework. The upper wall 104 of each frame 102 at the lower end of the chassis 98 extends laterally from the frame and is braced by diagonal struts 110. Pivotable casters 106 support the tubular chassis 98 on lower oval track 36 through these extended upper walls 104 on each side of the chassis. The pivotal axes of casters 106 are aligned in the plane defined by the axes of hinge poles 68, placing the center of gravity of the screen sections directly below the center of support of the casters.

Horizontal guide wheels 112 rotate on axes 114 within narrow rectangular frames 118. Each narrow frame is restrained within a wider frame 102 by closed flanges 118 on one side of frame 102, and open flanges 120 on the other side. A bolt 122 and wing nuts 124 secure the narrow frames 116 within the wider frames 102, adjacent to the side walls of oval tracks 34 and 36. Wing nuts 124 and bolts 122 enable removal of narrow frames 116 from within wider frames 102 through open flanges 120 for replacement of guide wheels 112. Guide wheels 112 function as lateral restraints for cantilevered support of carriages 32 and screen sections 30 against movement perpendicular to the plane of the screen sections, while allowing translational movement in the plane of the screen sections along tracks 34 and 36 on casters 106.

Horizontal tie bars 126, which pivot around the upper ends of the hinge poles 68 and the extended arms 128 of end caps 130 on the lever arms 94, joint adjacent carriages in a continuous train. Upper and lower tracks 34 and 36 extend in continuous closed oval loops, as shown in FIGURE 1, with the train of carriage 32 and the screen sections 30 forming a similar closed loop adjacent to and under the tracks.

An endless chain drive 132, which rotates on idler pulleys 134 and sprockets 136, moves the carriages along the tracks 34 and 36 in a continuous cycle. An individual driving link 138 of the drive chain 132 engages each carriage 32 in succession at a tapered lug 140 in a protective housing 142 on the tubular chassis 98 of the carriage. The sprockets 136 are positioned above the idler pulleys 134 to lower the driving link 138 onto the lug 140 as the carriage approaches the pulley, and to raise the driving link from the lug as the carriage passes. The drive chain 132 is driven in a counterclockwise direction by a hydraulic motor 144 through a chain 146 and sprockets 148. Supply pipes 150 provide hydraulic fluid under pressure to operate the motor 144.

Mutually inverted oval tracks 34 and 36 are supported by a series of rigid structural frames 152, as shown in FIGURE 4. Horizontal track supports 154 and 156 surround the outside walls of each track at spaced intervals, allowing sufficient clearance for free passage of the carriages 32 past the supports. Vertical beams 158 and skewed braces 160 and 162 anchor the track supports in horizontal parallelism, while transverse beams 164 and 166 fix the horizontal spacing between the opposite sides of the oval tracks. The spaced linear sections of the oval tracks 34 and 36 are joined together at adjacent ends by semicircular track sections of similar cross-section, as shown generally in FIGURE 1. The semicircular track sections at each end of the traveling screen 10 are supported by rigid structural frames essentially duplicating structural frames 152.

Vertical suspension cables 170 are strung from longitudinal suspension cables 172 and anchored to the screen 10 at holes 168 in the upper transverse beams 166 on the series of structural frames 152, as shown in FIGURES 1 and 4. The longitudinal suspension cables 172 span the river 24 between suspension towers 174, as in an ordinary suspension bridge.

Near the downstream and upstream ends 175 and 177 of traveling screen 10, concrete retaining walls 176 and 178 are recessed into banks 20 and 22 respectively, forming a restricted barrier to the passage of fish and suspended matter. The lower edges of screen sections 30 are submerged in the river 24, and travel in close conformity with the river bottom, forming a similarly restricted lower barrier. More complete sealing of the upstream from the downstream portions of the river can be achieved, when required, by additional baffles and rubber gaskets (not shown).

A channel 26, adjacent to the upstream face of the downstream end of traveling screen 10, diverts part of the river, forming a by-pass around a hazardous downstream environment (not shown). The traveling screen 10 is oriented in the river 24 at an acute angle to the direction of flow, and the speed of travel of the screen sections is adjusted to equalize the downstream component of screen speed to the mean rate of flow of the river. This relationship of screen speed to flow rate produces an efficient diversion of fish and suspended objects from the river 24 into by-pass channel 26.

As a screen section 30 traverses the river 24 on the upstream side of traveling screen 10, the wire mesh segments 38 of the screen section are held against the tubular framework 40 by water pressure. As the section 30 retraverses the river on the downstream side of the screen 10, the pivotable screen segments 38 align with the direction of flow, reducing the pressure of the river against the screen 10, and enabling particles trapped within the screen to flow downstream. The pivotable screen segments 38 additionally reduce the head loss at the screen 10 by minimizing the obstructive effect of the screen upon the river 24.

When a screen segment 38 reaches the upstream end 177 of the traveling screen 10, a freely rotating wheel 180, as shown in FIGURE 4, rides against the rectangular framework 48 of the segment, closing the segment for another filtering cycle. The mounting shaft 182 of wheel 180 pivots against a spring 184 on a shaft 186 to prevent damage to the screen segment when an obstruction hinders complete closure.

Figure 5:
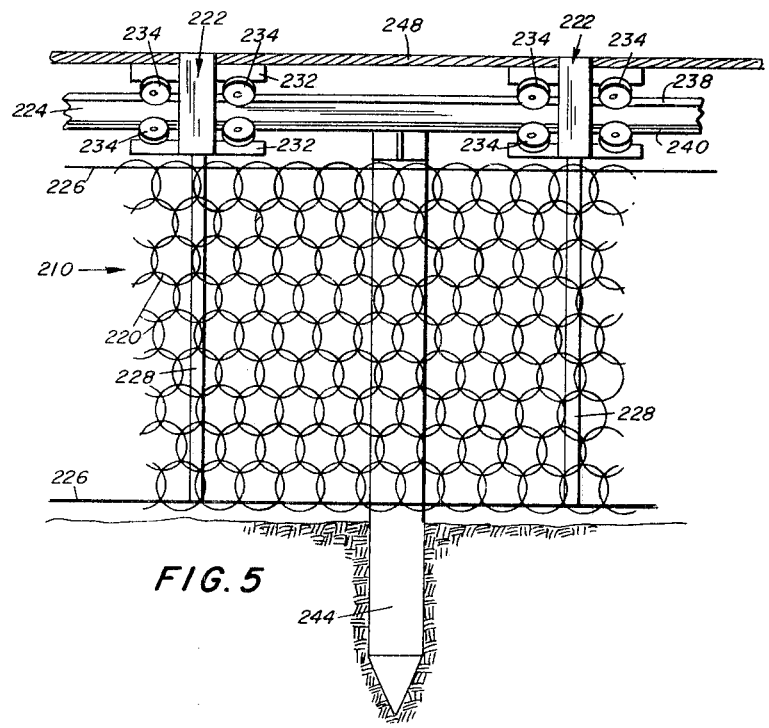
FIGURE 5 is a partial side view of a carriage and screen of another embodiment of the invention.
Figure 6:
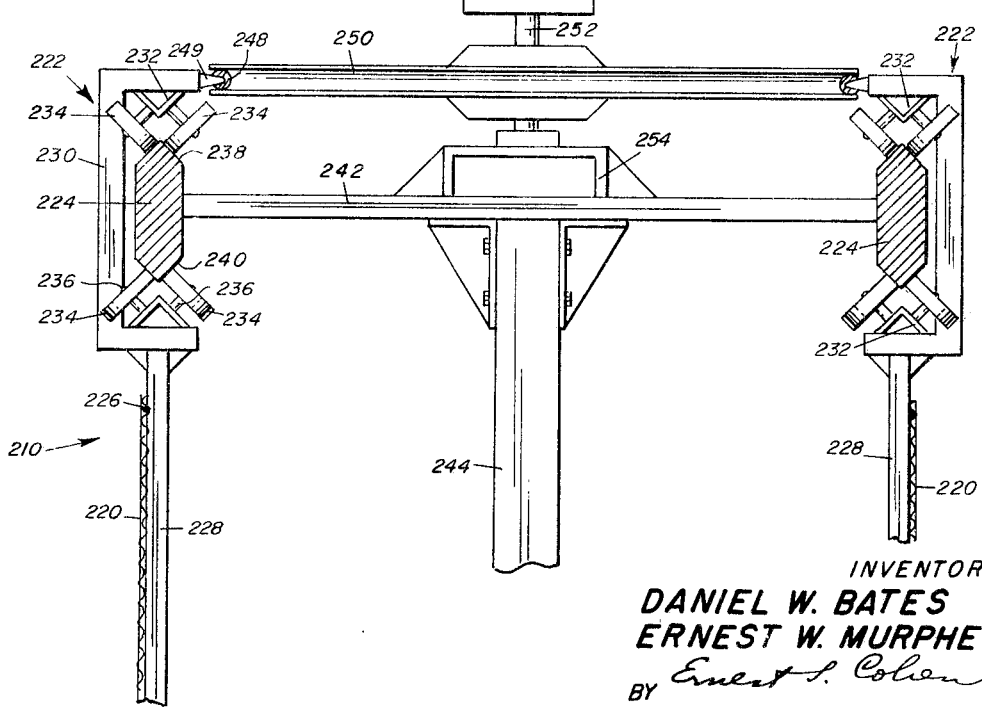
FIGURE 6 is a transverse view of a track support and carriages of the other embodiment of the invention.

Another embodiment of horizontal traveling screen 210 is shown in FIGURES 5 and 6. A continuous closed loop of flexible wire mesh 220 is suspended by cantilevered carriages 222 on a rigid oval track 224. The wire mesh 220 hangs on horizontal cables 226, strung between vertical poles 228 on carriages 222. The vertical poles 228 extend downward on each carriage from the outer wall of a rigid U-shaped chassis 230. Wheel mounts 232 of right angle cross-section extend beyond the opposite sides of chassis 232 from its opposite inner walls. Pairs of guide wheels 234 at each end of the wheel mounts 232 rotate on perpendicular axes 236, anchored on the perpendicular arms of the wheel mounts.

The carriages ride on the upper and lower races 238 and 240 of an oval track 224 of hexagonal cross-section. The races 238 and 240 of track 224 are formed, for example, by joining oppositely directed right angle channels to opposite edges of a rectangular beam. The wire mesh 220 moves freely with the carriages 222 in the plane of the mesh, and is restrained from perpendicular movement by the cantilevered restraint of wheels 234 on track 224.

A series of transverse beams 242 joins the parallel sections of track 224 and supports the track on vertical pilings 244 which are firmly anchored in a river bottom 246. The traveling screen 210 is positioned in a river in a manner similar to screen 10, as shown in FIGURE 1.

Adjacent carriages 222 on traveling screen 210 are joined in series to a continuous loop of drive cable 248 by a stud 249 on the edge of the upper chassis wall of each carriage. The drive cable 248 travels on horizontal bull wheels 250 which rotate on axles 252 at each end of the traveling screen. The axles 252 are supported by a framework 254 on the upper surface of transverse beams 242. At one end of the traveling screen a motor 256 powers the bull wheel 254 to drive the cable and carriages.

When heavy debris is present in a river, the fine mesh of the traveling screen 10 of FIGURES 1–4 is susceptible to damage as objects collide with the screen. A trash barrier (not shown) is positioned upstream from the screen to protect it from debris. While well known rigid trash barriers (not shown) are suitable for protecting the traveling fish screen 10, the alternate traveling screen 210 with a strong coarse mesh is a more efficient trash barrier. A conveyor (not shown) is positioned in a by-pass channel near the end of the coarse screen to remove debris swept from the river by the screen. The self-cleaning operation of screen 210, when used as a trash barrier, obviates the maintenance difficulties inherent in rigid trash barriers.

It is, therefore, apparent that useful devices have been described for separation of suspended matter from a fluid. In adapting the present exemplary disclosure to a specific separation environment, numerous modifications within the scope of the invention will become apparent to those skilled in the art.

For example, while the invention is described with reference to the particular application of restricting fish and other suspended particles from a hazardous environment, the invention is equally applicable to the separation or filtering of matter suspended in any fluid, including liquid and gas. The traveling cantilevered construction of the screen is adaptable to any filtering environment where immersion of the mechanism for guiding the filter media is objectionable, whether for reasons of maintenance corrosion prevention, or restricting the effects of the screen upon fluid flow.

Alternate supporting structures are well known in the art of bridge construction and can be equivalently substituted for the supports shown and described for the traveling cantilevered screen. Alternate filtering media and modified carriages for specific purposes can, likewise, be substituted for the specific filtering screens and carriages described. The angle of orientation of the traveling cantilevered screen in the filtered effluent can be varied to accommodate particular environments. Equivalent drive systems for endless media, as used in conveyors and ski lifts for example, can be substituted for the specific drives shown for the traveling cantilevered screen.

Other modifications will become apparent to those skilled in the art in the light of the above teachings and within the scope of the appended claims.

What is claimed is::

1. A filtering apparatus comprising:
a substantially planar porous filter medium,
a rigid track,
translatable cantilevered carriages riding on the rigid track and supporting the filter medium below the track for translation in the direction of the track, and for restraint from rotation around the track, and
means for translating the cantilevered carriages and filter medium along the track.

2. The apparatus claimed in claim 1 in which:
the substantially planar porous filter medium comprises a section of a loop of filter medium,
the rigid track includes a spaced pair of horizontally extending races, and
the translatable cantilevered carriages include wheels mounted for rotation on the horizontally extending races of the rigid track.

3. The apparatus claimed in claim 2 in which:
the loop of filter medium includes a flexible series of rigid filter medium sections connected in an oval loop,
the spaced pair of horizontally extending races form closed oval loops in vertically spaced horizontal planes, and
the translatable cantilevered carriages are connected between adjacent filter medium sections and are each simultaneously restrained by each of the spaced pair of horizontally extending races.

4. The apparatus claimed in claim 3 in which:
the spaced pair of horizontally extending races include horizontal and vertical walls, and
the wheels include supporting wheels communicating with a horizontal wall of the races for supporting the filter medium sections and carriages, and guiding wheels communicating with the vertical walls of the races for guiding the translation of the filter medium sections and carriages in the direction of the races and simultaneously restraining the filter medium sections and carriages from rotation around the track.

5. The apparatus claimed in claim 3 in which:
each filter medium section includes filter medium segments which are supported by and are pivotable upon a rigid framework within an area for which the closed oval loop defined by the filter medium sections forms an inner bound.

6. The apparatus claimed in claim 4 in which:
each filter medium section includes filter medium segments which are supported by and are pivotable upon a rigid framework within an area for which the closed oval loop defined by the filter medium sections forms an inner bound.

7. The apparatus claimed in claim 1 in which:
the filtering apparatus is positioned between the banks of a body of flowing water with the filter medium partially submerged in the body of water and with at least a part of the rigid track extending at an angle to the direction of flow of the water.

8. The apparatus claimed in claim 2 in which:
the filtering apparatus is positioned between the banks of a body of flowing water with the filter medium partially submerged in the body of water and with at least a part of the rigid track extending at an angle to the direction of flow of the water.

9. The apparatus claimed in claim 3 in which:
the filtering apparatus is positioned between the banks of a body of flowing water with the filter medium partially submerged in the body of water and with at least a part of the rigid track extending at an angle to the direction of flow of the water.

10. The apparatus claimed in claim 6 in which:
the filtering apparatus is positioned between the banks of a body of flowing water with the filter medium partially submerged in the body of water and with at least a part of the rigid track extending at an angle to the direction of flow of the water.

References Cited

UNITED STATES PATENTS

| | | | |
|---|---|---|---|
| 1,276,374 | 8/1918 | Keller | 210—154 X |
| 1,606,546 | 11/1926 | Wallene | 210—160 |
| 1,564,513 | 12/1925 | Bole | 210—160 X |
| 1,967,050 | 7/1934 | Brackett | 210—160 |

REUBEN FRIEDMAN, Primary Examiner

T. A. GRANGER, Assistant Examiner